United States Patent
Mason et al.

(10) Patent No.: US 9,634,475 B2
(45) Date of Patent: Apr. 25, 2017

(54) STRAIN RELIEF DEVICE FOR A HARNESS OR CABLE

(71) Applicant: Caterpillar Inc., Peoria, IL (US)

(72) Inventors: Joshua Mason, Washington, IL (US); Rakesh Yarlagadda, Edwards, IL (US); Omar Baba, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 225 days.

(21) Appl. No.: 14/542,959

(22) Filed: Nov. 17, 2014

(65) Prior Publication Data

US 2016/0141855 A1    May 19, 2016

(51) Int. Cl.
  *H01B 7/00*    (2006.01)
  *H02G 15/007*  (2006.01)
  *H01B 3/46*    (2006.01)

(52) U.S. Cl.
  CPC ............ *H02G 15/007* (2013.01); *H01B 3/46* (2013.01)

(58) Field of Classification Search
  CPC ...... H02G 15/007; H02G 15/00; H02G 15/02; H02G 15/04; H01B 3/46; H01B 3/47; H01B 7/0045
  USPC ..... 174/650, 72 A, 652, 653, 654, 660, 664, 174/665, 68.1, 68.3, 155, 156, 154, 135; 248/49, 68.1; 439/445, 449, 447, 452
  See application file for complete search history.

(56) References Cited

U.S. PATENT DOCUMENTS

| | | | |
|---|---|---|---|
| 2,727,088 A * | 12/1955 | Wall | H01B 17/58 174/135 |
| 3,056,852 A | 10/1962 | Sachs | |
| 3,395,244 A * | 7/1968 | Koehler | H01R 13/562 174/135 |
| 3,800,068 A * | 3/1974 | Torgerson | H01R 13/562 174/135 |
| 4,216,930 A | 8/1980 | Rossler, Jr. et al. | |
| 4,641,905 A * | 2/1987 | Poliak | H02G 3/065 174/665 |
| 4,718,860 A | 1/1988 | Gobets et al. | |
| 4,808,774 A * | 2/1989 | Crane | H02G 3/083 174/135 |
| 5,460,540 A * | 10/1995 | Reichle | H01R 13/562 439/445 |
| 5,494,457 A * | 2/1996 | Kunz | H01R 13/58 439/447 |
| 5,758,004 A | 5/1998 | Alarcon et al. | |
| 8,365,404 B2 | 2/2013 | Van Swearingen | |
| 9,331,463 B2 * | 5/2016 | Yamazaki | H02G 3/22 |
| 2014/0111044 A1 | 4/2014 | Baumann et al. | |

FOREIGN PATENT DOCUMENTS

EP    1147576 A1    10/2001
WO   2007/113307 A1    10/2007

* cited by examiner

*Primary Examiner* — Angel R Estrada
(74) *Attorney, Agent, or Firm* — Mattingly, Burke, Cohen & Biederman

(57) ABSTRACT

A strain relief device includes an elongated body having a first and second end, the elongated body defining an elongated hole extending from the first end to the second end; and edges in the body defining a plurality of voids between the first and second end, wherein the edges become shorter in length from the first end to the second end such that the shorter edges define progressively smaller voids in the body from the first end to the second end. A method of providing a strain relief is also disclosed.

20 Claims, 4 Drawing Sheets

STRAIN RELIEF DEVICE FOR A HARNESS OR CABLE

TECHNICAL FIELD

This patent disclosure relates generally to a strain relief device and, more particularly, to a strain relief device for a harness.

BACKGROUND

Conduits, cables, and harness assemblies often include a cable or other conduit that fits into a relatively rigid portion. The cable or conduit may be subject to flexing over the course of its use. This flexing may result in concentrated stress or strain at the point of where the conduit for cable attaches to the more rigid structure. Over time, this increased stress and strain can result in the conduit and/or protective isolative covering over the conduit cracking, breaking, or otherwise failing.

Strain relief devices have been used at the connection between the conduit or cable and the more rigid structure in order to reinforce the conduit or cable at the point of connection to the more rigid structure. However, some strain relief devices suffer from various drawbacks. For example, some strain relief devices transfer concentrated stress from a point where the cable conduit enters more rigid structures to the point where the conduit or cable contacts the strain relief device. Other strain relief devices cannot withstand high temperatures and/or are not able to bend at extreme angles. Other strain relief devices suffer from various other drawbacks.

WO 2007/113307 titled "RETENTION FERRULE FOR CABLE CONNECTOR" describes an apparatus that is of a similar construction along its axial length. As a result, it is assumed that it maintains a similar stiffness along its length, which may, in some instances, result in directing strain towards a point where the strain relief device and conduit or cable meet. Accordingly, there is a need for an improved strain relief device.

SUMMARY

In one aspect, the disclosure describes a strain relief device that include an elongated body having a first and second end, the elongated body defining an elongated hole extending from the first end to the second end; and edges in the body defining a plurality of voids between the first and second end, wherein the edges become shorter in length from the first end to the second end such that the shorter edges define progressively smaller voids in the body from the first end to the second end.

In another aspect, the disclosure describes a method of providing a strain relief device. The method includes forming a strain relief device body having two ends; forming an elongated hole in the strain relief device body connecting the first end to the second end; providing edges defining voids in the conduit; and dimensioning the edges to be shorter from the first end of the body to the second end of the body such that the voids defined by the edges become progressively smaller from the first end of the body to the second end.

In yet another aspect, the disclosure describes a strain relief device that includes an elongated body made of a silicone material, the body having a first and second end, the elongated body defining an elongated hole extending from the first end to the second end, wherein the body has two clamshell sections, each clamshell section having a first and second end which correspond to the first and second ends of the body, and edges in each of the clamshell sections defining a plurality of voids between the first and second ends, wherein the edges become shorter in length from the first end to the second end such that the shorter edges define progressively smaller voids in the clamshells from the first end to the second end.

DETAILED DESCRIPTION

Figure 1:
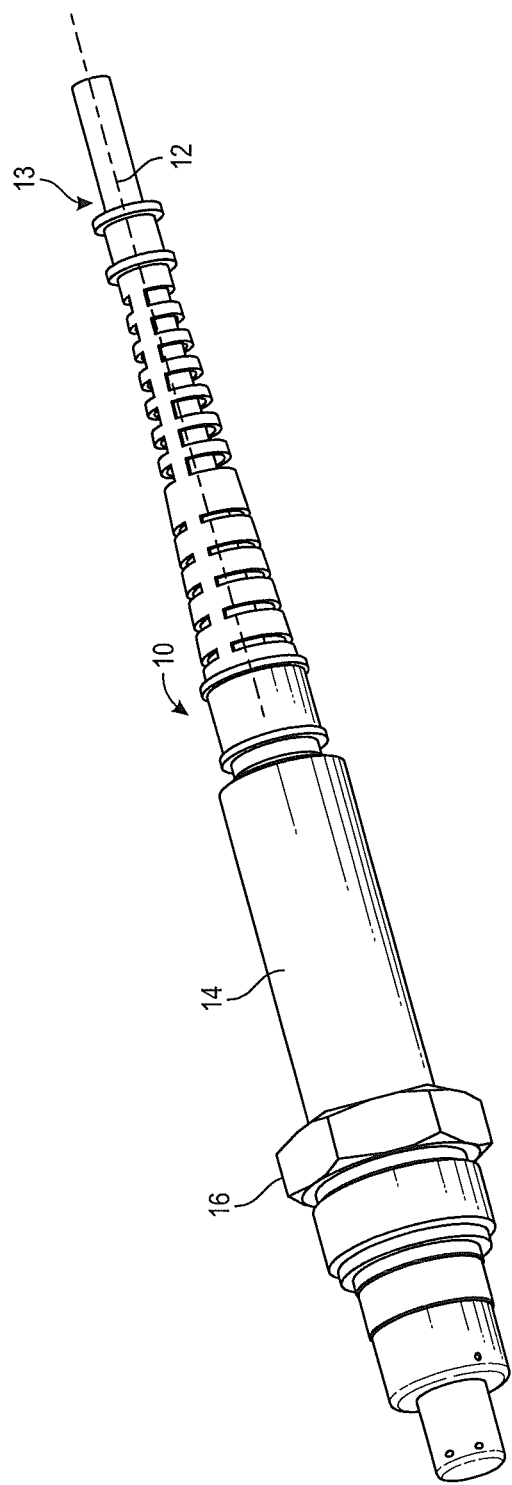
FIG. 1 is a perspective view of a strain relief device assembly attached to a sensor.

Now with reference to the drawings, like reference numbers refer to like elements, FIG. 1 is a perspective view of a strain relief device 10 that is installed about a cable 12 which may be connected to a sensor 14. The sensor 14 may be a NOx sensor, a pressure sensor, a temperature sensor, or any other type sensor. In other aspects, the strain relief device 10 may be used on a cable or cord that is not associated with a sensor all. FIG. 1 shows an area 13 where the cable 12 connects to the strain relief device 10. The sensor 14 also has an attaching nut 16 which allows the sensor 14 to be twisted. Typically, twisting is desired to install the sensor 14 via threads (not shown).

Figure 2:
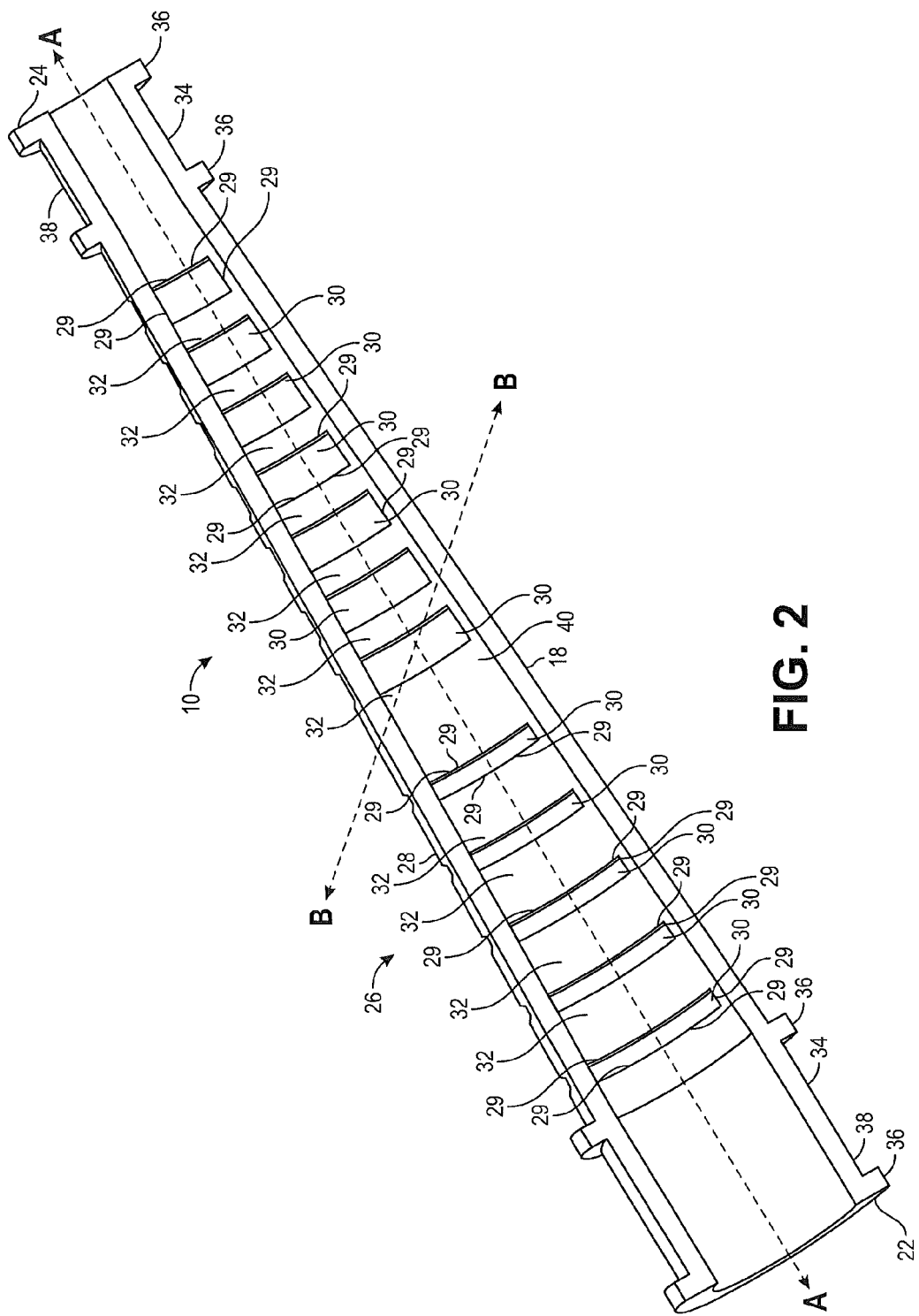
FIG. 2 is a perspective view of a clamshell comprising part of the strain relief device.

FIG. 2 is a perspective view of a portion of the strain relief device 10. The strain relief device 10 may be comprised of a first clamshell 18 and a second clamshell 20. (See, for example, FIGS. 3 and 4). FIG. 2 illustrates the first clamshell 18. In some aspects the second clamshell 20 is structurally the same as, or similar to, the first clamshell 18. As result, one of ordinary skill in the art after reviewing this disclosure will understand features associated with a second clamshell 20 without a separate description of it beyond what is described with respect the first clamshell 18.

The first clamshell 18 has a first end 22 and a second end 24. In some aspects, the clamshell 18 has a generally tapered shape 26 so that when the first clamshell 18 and second clamshell 20 are assembled as shown in FIG. 1, the strain relief device 10 has a cross-sectional diameter that is larger at the first end 22 and gradually gets smaller so that the cross-sectional diameter of the strain relief device 10 at the second end 24 is smaller than the cross-sectional diameter of the first end 22.

The first clamshell 18 includes a body 28. In some aspects the body 28 is comprised of a silicone material. For example, in some aspects, the body 28 is composed of a fluro-silicone material that may be commercially available. In some aspects, the body 28 is made of a silicone material that has a durometer of at least 80 shore A. Furthermore, the material comprising the body 28 may be resilient and is biased to return to an initial shape when the material is flexed and deformed to a shaped different than that of the initial shape. The initial shape may be any initial shape desired. However in some aspects, the initial shape is a straight, elongated shape. An example of a straight, elongated shape is shown in FIGS. 1 through 4. In some instances, during use the strain relief device 10, the strain relief device 10, may be bent at extreme angles including or exceeding a 90° bend.

In some aspects, the initial shape may be at an elongated shape at least four times longer than the cross-sectional diameter at the first end 22. The longer the length of the strain relief device 10, the more the strain relieve device 10 can spread strain over a longer area. As a result, a longer strain relief device 10 may provide better performance than a shorter one.

The material comprising the body 28 may be selected so that the strain relief device 10 may be bent up to and perhaps exceeding a 90° bend but will still be biased to return to its initial shape once the forces causing the strain relief device to bend are removed. Furthermore, the material may be selected so that the strain relief device 10 may be subjected to temperatures up to, and in some instances exceeding, 200° C. The materials selected may withstand temperatures up to, and including, 200° C. without causing melting, deformation, or otherwise degradation of the strain relief device 10. Furthermore, in some aspects, the material selected may be able to withstand multiple cycles of temperatures moving up to 200° C. and cooling back down again as well as being bent at extreme angles without degrading the material or causing the material to no longer be biased to return to its initial shape. As mentioned above, the material may be a silicone material and/or fluro-silicone.

As shown in FIG. 2, the first clamshell 18 includes edges 29 which define voids or holes 30. The body 28 is present between the holes or voids 30. In some aspects, the holes or voids 30 are smaller near the first end 22 and grow larger toward the second end 24 of the clamshell 18. The holes 30 can grow successively larger along the length of axis A-A from the first end 22 to the second end 24. Alternatively, holes 30 of similar size may be grouped together and the various groups may have different sized holes 30 within the groups and the size of the holes 30 growing larger along axis A-A from the first end 22 to the second end 24. In addition, the edges 29 may be shorter or smaller towards the first end 22 and grow larger and thus, define larger holes or voids 30 toward the second end 24. The change in shape and size of the holes or voids 30 along the length of the strain relief device 10, results in the strain relief device 10 having a different stiffness along the axis A-A or, in other words, a difference in stiffness along the axial length of the strain relief device 10. Having a different stiffness along the length of the strain relief device 10, results in stress and/or strain being spread along the length of the strain relief device. Having a different stiffness can also reduce the likelihood of the strain relief device concentrating stress at an area 13 where the conduit 12 and strain relief device 10 meet.

As a corollary to the holes 30 becoming larger from the first end 22 to the second end 24, the body sections 32 between the holes 30 becomes smaller from the first end 22 to the second end 24. Because these sections 32 becomes smaller, the strain relief device 10 becomes less rigid toward the second end 24 compared to the first end 22. What can further contribute to the change in rigidity along the length of the strain relief device is the fact that the strain relief device 10 is tapered 26. Thus, the reduction in rigidity at the second end 24, may be attributed to reduced material present in the strain relief device 10 resulting from the strain relief device 10 being smaller due to the tapered shape 26, and the reduction of material present in the strain relief device 10 due to the reduction in size of the body sections 32 between the increasing in sized voids 30. The holes 30 may be oriented to have an axis B-B that intersects axis A-A at a right angle.

Figure 3:
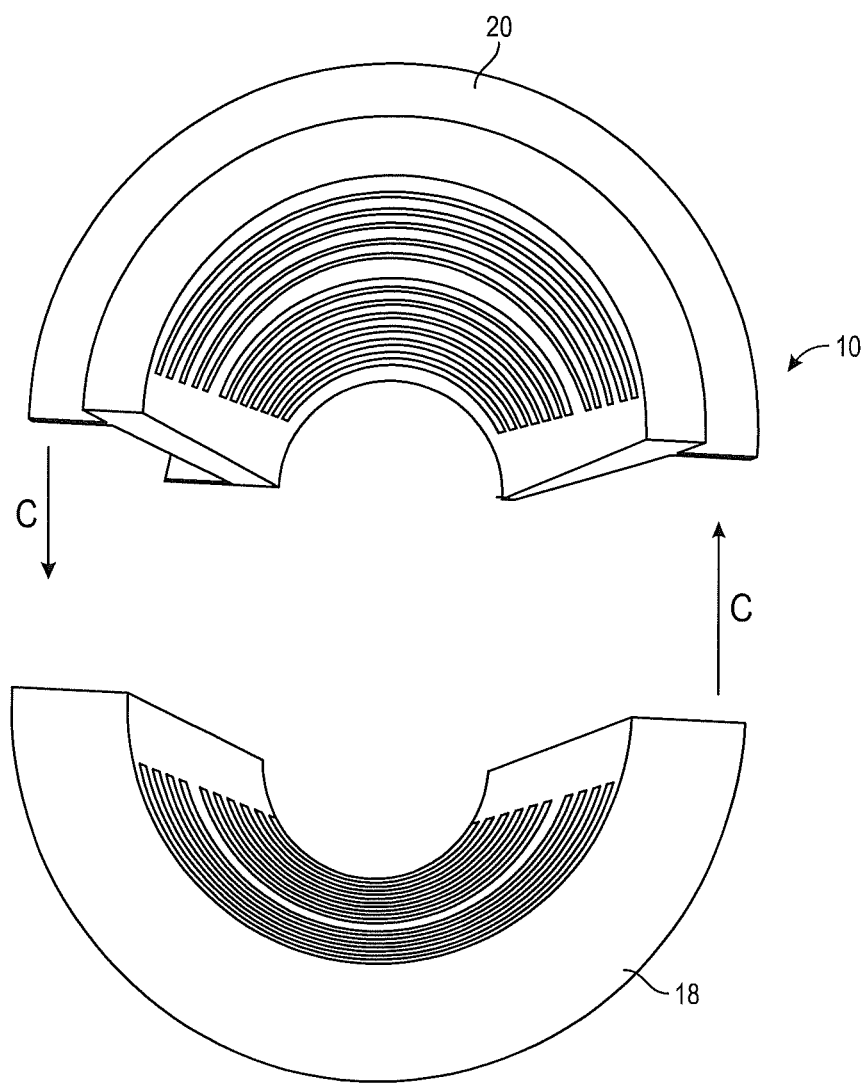
FIG. 3 is a perspective, exploded end view of two clamshells which form the strain relief device.

FIG. 3 is an end view of a strain relief device 10 comprising the first clamshell 18 located over the second clamshell 20. The arrows C illustrate how the clamshells 18 and 20 fit together to form the strain relief device 10. FIG. 3 illustrates that the strain relief device 10 has, when assembled, a cross-section generally in the shape of an annulus.

Figure 4:
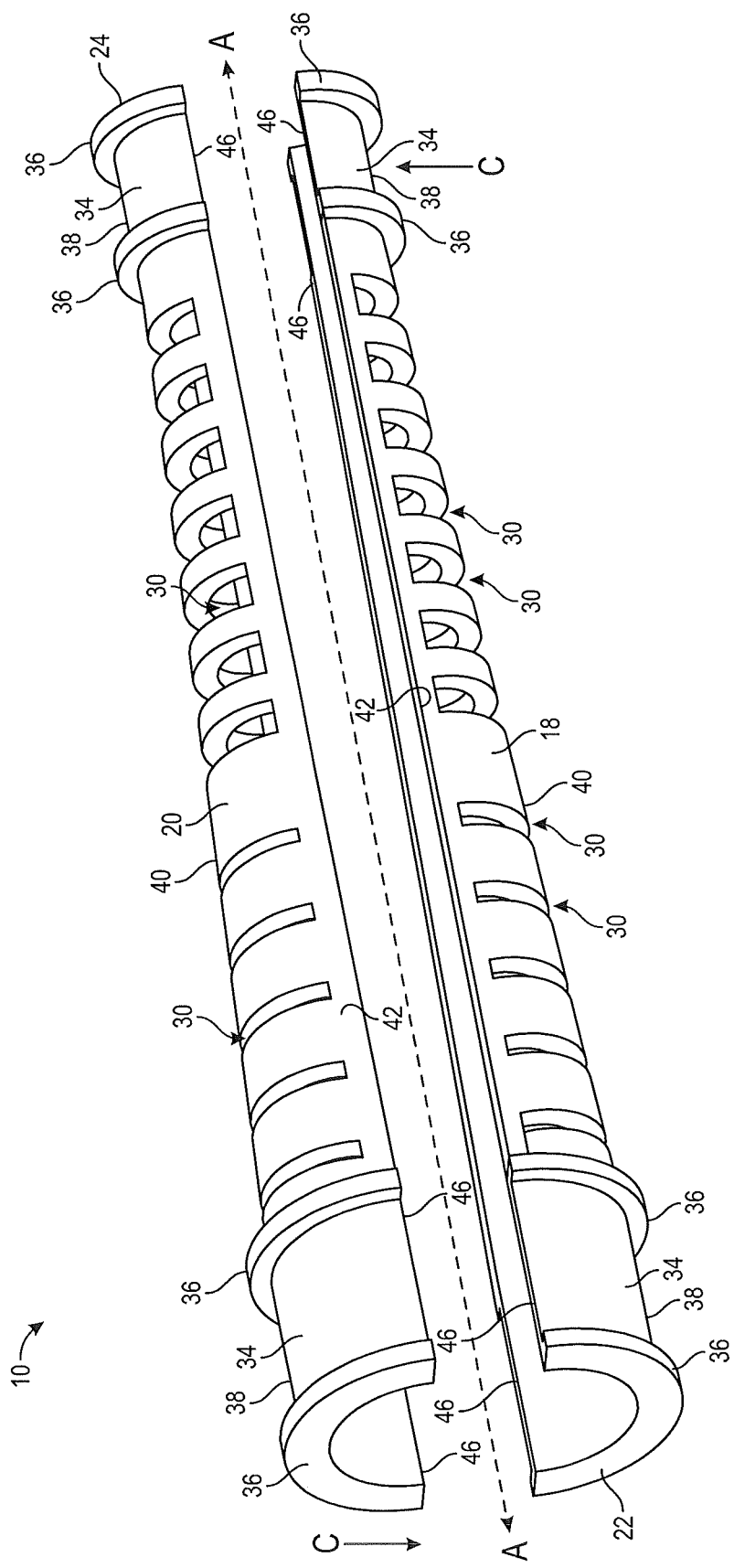
FIG. 4 is an exploded, perspective, side view of two clamshells which foam the strain relief device.

FIG. 4 is a perspective view of the first clam shell 18 and the second clamshell 20 located beneath the first clamshell 18. Again the arrows C illustrate how the clamshells 18 and 20 can come together. The voids or holes 30 are illustrated as increasing in size moving along axis A-A from the first end 22 to the second end 24.

As shown in FIGS. 2 and 4, The ridges 36 define solid sections 34 where there are no holes or voids 30 in the flat sections 38 between the ridges 36. Sets of ridges 36 can be found near the first end 22 and the second end 24. In some aspects, the flat sections 38 between the ridges 36 may be used as a location for a connecting band or other mechanical fastener for connecting the first clamshell 18 to the second clamshell 20.

In some aspects, the strain relief device 10 may include a solid middle section 40 in which no holes or voids 30 are present. In some aspects, the solid middle section 40 may also be used as a place to locate a mechanical fastener for connecting the first clamshell 18 to the second clamshell 20.

In some aspects, and as shown in the figures, both clamshells 18 and 20 may include seam regions 42 which are located along axis A-A. No voids or holes 30 are located in the seam regions 42. In other aspects, holes or voids 30 may be present in the seam regions 42. The seam regions 42 may define a contacting surface 44 where the first clamshell 18 and the second clamshell 20 contact each other when the strain relief device 10 is assembled.

INDUSTRIAL APPLICABILITY

The strain relief device 10, as described herein, may be used as a protective apparatus to be fit over cables, conduits, or any other elongated flexible connector. The strain relief device 10 may help protect a cable or conduit from stress and strain which can cause cracking or any other undesirable degradation in performance for the conduit, cable, or other flexible connector. Some advantages found in the strain relief device 10, described herein, are that it is able to withstand high temperatures without degradation of its performance. In addition, the strain relief device 10, described herein, may be bent at extreme angles and spread stress over the length of the strain relief device 10. By having a different stiffness along the strain relief device 10, the strain relief device 10 can diffuse stress along the length and reduces the likelihood of concentrating stress on the cable, conduit, or other flexible connector.

One of ordinary skill in the art after reviewing this disclosure will be able to manipulate the design and/or material used in the strain relief device 10 to achieve a desired stiffness in the strain relief device 10. For example, the size and location of the holes 30, the amount of taper, and the material used to make the strain relief device 10 can be adjusted to achieve a strain relief device 10 having desired characteristics for a particular application.

It will be appreciated that using larger holes 30 and/or locating the holes 30 close together along one portion of the strain relief device 10 will result in that portion of the strain relief device 10 being less rigid. This is due to the fact that larger holes 30 and/or the holes 30 being spaced closely together results in less material being present in that portion of the strain relief device 10. With less material being present in that portion, that portion will become less rigid.

Conversely, reducing the size of the holes 30 and/or spacing the holes 30 farther apart along a portion of the strain relief device 10 will result in that portion of the strain relief device 10 being more rigid. This is due to the fact that by making the holes 30 smaller and/or spacing the holes 30 apart, more material will be present along that portion of the strain relief device 10. With that portion having more material, then that portion will become more rigid.

It should also be appreciated that tapering the outer diameter of the strain relief device 10 will results in greater material present at the larger end of the strain relief device and less material being present at the tapered end. With less material being present along the length of the strain relief device 10 as result of the taper, the rigidity or stiffness of the strain relief device 10 will vary from more rigid at the non-tapered to less rigid toward the tapered end.

Additional advantages may be found in that even when the strain relief device 10 described herein is bent at extreme angles, the strain relief device 10 will still be biased to return to its original configuration. In addition, in some aspects, even if the strain relief device 10 is subject to several cycles of intense heat while bent at an extreme angle, the strain relief device 10 will not be thermally set to a new position but rather will still be biased to return to its original configuration.

It will be appreciated that the foregoing description provides examples of the disclosed device and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

We claim:

1. A strain relief device comprising:
an elongated body having a longitudinal axis extending between a first end and a second end, the elongated body including an inner surface defining an elongated hole extending from the first end to the second end, and an outer surface; and
edges in the body defining a plurality of voids between the first end and the second end, and each of the plurality of voids extending in a radially inward direction from the outer surface to the inner surface, such that each of the plurality of voids is in communication with the elongated hole;
each of the plurality of voids having a first closed end at a first circumferential location about the longitudinal axis and a second closed end at a second circumferential location about the longitudinal axis, and extending in a circumferential direction about the longitudinal axis between the first closed end and the second closed end such that each of the plurality of voids has an arcuate shape;
wherein the edges become shorter in length from the first end to the second end to form shorter edges such that the shorter edges define progressively smaller voids in the body from the first end to the second end of the elongated body.

2. The strain relief device of claim 1, wherein the body is comprised of two clam shell sections.

3. The strain relief device of claim 2, further comprising first pair of ridges located proximate to the first end and a second pair of ridges located proximate to the second end, wherein the body defines a first relatively flat section between the first pair of ridges and a second relatively flat section between the second pair of ridges.

4. The strain relief device of claim 2, wherein both of the two clam shell sections define elongated substantially flat connecting surfaces that are dimensioned and configured to allow the two clam shell sections to fit together along the connecting surfaces to form seams and the body formed by the two clam shell sections will have a cross-sectional shape of an annulus.

5. The strain relief device of claim 1, wherein the body is dimensioned to be tapered to have a larger cross-sectional diameter at the first end and a smaller cross-sectional diameter at the second end.

6. The strain relief device of claim 1, wherein the body is made of a silicone material.

7. The strain relief device of claim 6, wherein the body has a durometer of approximately 80 shore A.

8. The strain relief device of claim 6, wherein the silicone material can withstand temperatures of 200° C.

9. The strain relief device of claim 8, wherein the silicone material is resilient and will be biased to return to an original strain relief device assembly shape after being deformed and subjected to temperatures of up to 200° C. while deformed.

10. The strain relief device of claim 1, wherein the elongated hole has a longitudinal axis and the voids have void axes that intersect the longitudinal axis at substantially a right angle.

11. The strain relief device of claim 1, wherein the body is at least 4 times longer than a cross-sectional diameter at the first end.

12. The strain relief device of claim 1, wherein the body is made of a fluro-silicone material.

13. The strain relief device of claim 12, wherein the strain relief device is part of a NOx sensor.

14. A method of providing a strain relief device comprising:
forming a strain relief device body having a longitudinal axis extending between a first end and a second end, and including an inner surface and an outer surface;
forming an elongated hole defined by the inner surface in the strain relief device body and connecting the first end to the second end;

providing edges defining voids in the strain relief device body, each of the voids extending in a radially inward direction from the outer surface to the inner surface, such that each of the voids is in communication with the elongated hole, and each further having a first closed end at a first circumferential location about the longitudinal axis and a second closed end at a second circumferential location about the longitudinal axis and extending in a circumferential direction about the longitudinal axis between the first closed end and the second closed end such that each of the plurality of voids has an arcuate shape; and dimensioning the edges to be shorter from the first end of the body to the second end of the body such that the voids defined by the edges become progressively smaller from the first end of the body to the second end.

15. The method of claim 14, wherein the forming the strain relief device body includes forming a first clam shell section and a second clam shell section.

16. The method of claim 14, wherein the strain relief device body is formed of a silicone material.

17. The method of claim 16, wherein the silicone material is resilient and is biased to return to an original strain relief device position after being deformed and subjected to temperatures of at least 200° C.

18. The method of claim 16, wherein the silicone material has a durometer of approximately 80 shore A.

19. A strain relief device comprising:

an elongated body made of a silicone material, the body having a longitudinal axis extending between a first end and a second end, the elongated body defining an elongated hole extending from the first end to the second end, wherein the body has two clam shell sections, each clam shell section having a first end and a second end which correspond to the first end and the second end of the body; and edges in each of the two clam shell sections defining a plurality of voids between the first end and the second end of the corresponding clamshell section, wherein the edges become shorter in length from the first end to the second end to form shorter edges such that the shorter edges define progressively smaller voids in each of the two clamshells from the first end to the second end of the corresponding clam shell section, and wherein each of the plurality of voids is in communication with the elongated hole and has a first closed end at a first circumferential location about the longitudinal axis and a second closed end at a second circumferential location about the longitudinal axis, and extending in a circumferential direction about the longitudinal axis between the first closed end and the second closed end such that each of the plurality of voids has an arcuate shape.

20. The strain relief device of claim 19, wherein the body is dimensioned to be tapered to have a larger cross-sectional diameter at the first end and a smaller cross-sectional diameter at the second end.

* * * * *